July 29, 1952     J. E. HALE     2,604,921
RIM
Filed Nov. 13, 1946
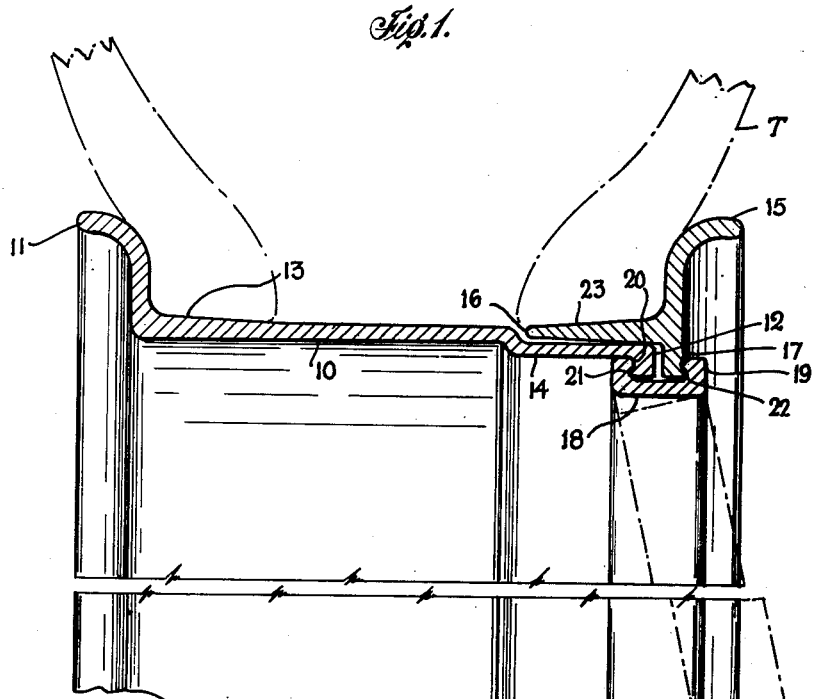
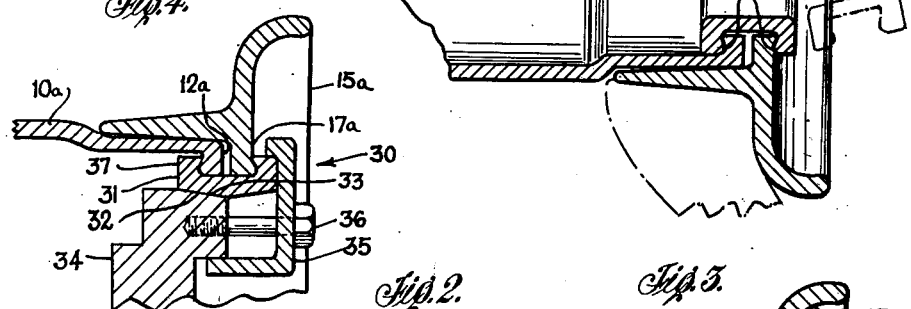
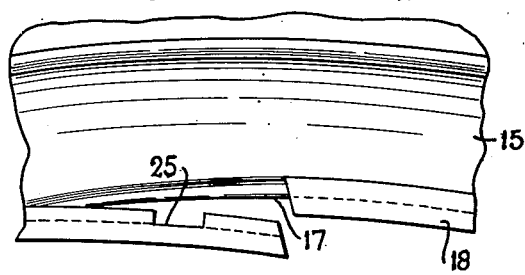
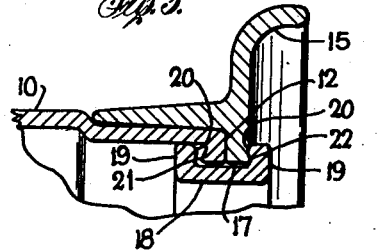
INVENTOR
JAMES E. HALE
BY
ATTORNEYS Patented July 29, 1952

2,604,921

UNITED STATES PATENT OFFICE 2,604,921

RIM

James E. Hale, Akron, Ohio, assignor to The Firestone Tire & Rubber Company, Akron, Ohio, a corporation of Ohio Application November 13, 1946, Serial No. 709,558

1 Claim. (Cl. 152—410)

This invention relates to rims for pneumatic tires, especially to rims adapted to carry truck tires.

The primary problem in tire mounting is that the tire beads will be chafed and flexed literally thousands of times in the life of the tire if the beads of the tire are not firmly engaged by the tire rim and side flanges when the tire is operatively mounted thereon. This has led to the formation of special tapered bead seats on rim bases adjacent the side flanges thereof and has required that the rims be formed from sections that are separable so that the tire can be positioned on the special bead seats provided. The tight positioning of tire beads is, of course, materially affected by the cooperation of the rim side flanges and rim base. Where a side flange is removable with relation to the rim seat, it is difficult to realize the tight bead positioning desired. Then, too, if the side flange is improperly formed, the tire bead may rock on the rim flange and this flexure will reduce the life of the tire.

Heretofore, many types of rims have been proposed and one construction which has proven quite satisfactory for mounting truck tires tightly thereon has been a rim made from rim sections which are coupled together by means of bolts that extend axially through radially inwardly extending flanges formed integrally with the rim sections. However, the use of such rim constructions is somewhat unsatisfactory since appreciable time and labor is required to secure the rim sections together while it is also is difficult to determine whether all of the pressure in the tire is removed before completely freeing the rim sections from each other. This style of rim construction also is undesirable because it is relatively heavy. Other types of rims proposed for truck tires have been objectionable because they have been too heavy, or too complicated to manufacture to be readily assembled and disassembled, have not been provided with safety members to prevent their disengagement when it is unsafe to disengage them, or have not tightly seated the tire beads on the rim.

The general object of the present invention is to avoid and overcome the foregoing and other disadvantages of and objections to known types of tire rims and to provide an improved rim construction which is characterized by the firmness of its tire mounting action and by its inherent safety construction that prevents its release when pressure exists in a tire mounted thereon.

Another object of the invention is to provide a low-cost, light-weight, sturdy rim construction. A further object of the invention is to provide a rim construction which does not require a tire protecting flap in a tire mounted thereon.

Another object of the invention is to provide a circumferentially divided rim construction which is adapted to have a pneumatic tire easily mounted on, or removed from it and which tightly seats the tire beads on the rim.

Another object of the invention is to provide a rim with a lock ring which is clearly either properly and safely in locking position or else clearly not in such locking position.

A further object of the invention is to provide a rim construction which, when mounting an inflated tire thereon, will have a tight and immovable fit between the tire and rim, and the rim sections will present unbroken surfaces so that all water, or dirt and other foreign material will be kept out of the tire assembly.

A further object of the invention is to provide a divided rim construction that can be either fixedly or removably associated with its mounting wheel.

Yet another object is to provide a circumferentially divided rim which will not come apart when run with the tire thereon flat.

The foregoing and other objects and advantages of the invention, which will become apparent as the specification proceeds, are achieved by the provision, broadly speaking, of a cylindrical rim section having a tire engaging side flange portion at one edge thereof and a radially inwardly extending lock ring engaging flange at the opposite edge thereof, a second annular rim section having a bead engaging flange thereon and a portion adapted to engage with the cylindrical rim section, which second rim section also has a radially inwardly extending lock ring engaging flange, and a split lock ring adapted to engage with the lock ring flanges on the rim sections to secure the sections together.

Attention is directed to the accompanying drawings for disclosure of an operative embodiment of the invention, wherein:

Fig. 1 is a transverse vertical section of a rim embodying the principles of the invention with the release position of the lock ring being indicated in broken lines;

Fig. 2 is a fragmentary side elevation of the rim of Fig. 1 with the locking ring being shown in partially unlocked position;

Fig. 3 is a fragmentary section of the locking portion of the rim in assembled but unlocked position; and Fig. 4 shows a modification of the rim of the invention.

Referring now in detail to the structure shown in the accompanying drawings, there is shown a substantially cylindrical annular member or rim section 10 which has a tire engaging flange 11 formed at one margin thereof and a radially inwardly directed lock flange 12 formed at the opposite margin thereof. The rim section 10 is provided with an inclined tire bead seat portion 13 at the foot of the flange 11 to form a tight, solid seat with the radially inner edge of the bead of a tire T mounted on the rim, as is customary in preferred tire mounting constructions today. The rim section 10 also has a circumferentially extending, radially inwardly offset portion 14 of any desired width formed on its edge remote from the flange 11 for a purpose which will be explained more clearly hereafter.

A second annular rim section 15 is provided to form the second annular portion of the circumferentially divided rim of the invention and this section 15 has a tire engaging flange formed integrally therewith while a cylindrical section 16 is formed on the rim section 15 and such section 16 is adapted to telescope snugly over the radially outer surface of the annular offset portion 14 to engage the rim sections 10 and 15 for support action. A radially inwardly extending locking flange 17 is also provided on the rim section 15 and such flange 17 is adapted to lie immediately adjacent and, if desired, in contact with the surface of the lock flange 12 when the portion 16 is in engagement with the offset section 14 of the rim section 10.

In order to prevent undesired separation of the rim sections 10 and 15, and to secure such sections together, a transversely split, resilient locking ring 18 is secured, removably, to the locking flanges 12 and 17 to retain the rim sections together. The locking ring 18 is roughly C or channel shaped in section and is provided with two arms 19 the inner surfaces of which have continuous annular lips 20 formed thereon on the inner edges thereof. These lips 20, as a special feature of the invention, are adapted to engage with lips 21 and 22 that are formed on the outer edges of the flanges 12 and 17, respectively, when the rim sections are forced apart in an axial direction, so that a locked engagement position is provided for the locking ring 18.

It will be realized that when a pneumatic tire is positioned upon the rim of the invention, and such tire is inflated, such tire sets up a separating or transversely directed force on the associated rim sections 10 and 15 whereby they are urged apart by an axially directed force. Such force will occasion continued engagement of the lips 20 with the lips 21 and 22 and prevent disengagement of the locking ring when such pressure exists in a tire carried by the rim. However, when all of the pressure in the pneumatic tire mounted on the rim is released, then the rim sections are relatively freely movable with relation to each other and the locking ring 18 can be progressively pried off of the locking flanges 12 and 17 or onto the flanges when assembling a tire on the rim of the invention.

The rim section 15 also is provided with a tapered bead seat portion 23 on its radially outer surface for firmly and tightly positioning the second bead of the tire T. Since the section 10 extends substantially across the base of the tire T carried by the rim of the invention, and only the second tire bead contacts the rim section 15, it may not be necessary to use a tube protecting flap with the tire T since the tube carried on such mounted tire is only exposed to the cylindrical periphery of the rim section 10. In operation, of course, a pneumatic tire mounted on the rim of the invention will be in tight engagement with the tire engaging flanges of the rim and the locking ring 18 will likewise be in tight engagement with the rim sections whereby it will be impossible for water or other foreign material to enter the rim whereby corrosion of same, or deterioration of the tire is substantially prevented.

Due to the annular construction of the rim section 15 and its cylindrical portion 16, it will be seen that the section is of high strength and cannot easily be distorted or bent in any manner so as to make it unusable. The sections 10 and 15 can be made in any suitable manner, as by rolling a metal strip to the desired contour and welding the ends of the strip together, while the locking ring 18 normally should be made of some type of spring steel whereby it will retain its annular shape but will be adapted to be sprung in or over the lock flanges 12 and 17 when the rim sections are to be secured together or to be released. The normal diameter of the ring 18 is such that it snugly engages the flanges 12 and 17, as shown in Figs. 1 and 3.

Since a pneumatic tire when operated when flat still has some laterally outwardly directed forces set up therein, and due to the locking ring being fixed in engagement with the locking flanges, the rim of the invention will not come apart even though operated when flat. The engagement of the cylindrical section 16 of the rim section 15 with the offset 14 contributes to this operational feature. Since the locking ring 18 is progressively pried into or out of engagement with the locking flanges and no bolts or clamps are associated with it, the rim sections can easily be secured together or released from each other when the tire T is deflated and the rim sections are freely movable axially with relation to each other. A tool receiving slot 25 is provided in the ring 18 adjacent one end thereof to facilitate working the ring into or out of its locked position.

From the foregoing it will be seen that a safe rim construction is provided because one will immediately be able to determine whether the locking ring is in proper locking position before attempting to inflate a tire mounted on the rim. Likewise, the locking ring cannot be released from engagement with the locking flanges when the tire is inflated due to the lips 21 and 22 remaining in engagement with the lips 20 on the locking ring. Furthermore, the rim design reduces radial run out to a minimum. Thus, a safe, easily manufactured, inexpensive, sturdy rim construction is provided that is especially suited for mounting large truck tires, and the objects of the invention are achieved.

Fig. 4 shows a rim 30 which is adapted to be removably mounted on a wheel whereas the rim of Figs. 1 and 3 is usually fixedly associated with the wheel on which it is mounted with only the section 15 and lock ring 18 being removable. The rim 30 has a cylindrical member 10a and an annular section 15a that are the same as the member 10 and section 15 while a slightly different type of locking ring 31 is provided. The ring 31 is transversely split, like the ring 18, but it has a substantially V shaped or tapered radially inner surface 32. The ring 31 then is used to position the rim 30 on a complementary tapered seat 33 on a wheel 34 and is removably secured thereto by any desired conventional means, such as lugs 35 and cap screws 36 that engage with the wheel 34 so as to clamp the lugs 35 against the ring 31 to secure it to the wheel. To mount the rim fixedly on the wheel, it is advisable to have the lock flanges 12ª and 17ª of the member 10ª and section 15ª bottom on the ring 31, as shown.

Then slight radial clearance is provided between the laterally inner flange 37 of the lock ring and the rim base 10ª, as shown. This modified construction of the invention is the reverse of that shown in Figs. 1 to 3 as in such instance the laterally inner rim flange will abut the rim base and the lock flanges 12 and 17 will be spaced from the base of the lock ring 18. It will be observed that the load on the rim 30 is transmitted to the wheel 34 solely through the ring 31 and this narrow load transmittal area is desirable in many instances.

The invention, it will be seen, broadly relates to a circumferentially divided rim the sections of which telescope into engagement and have radially inwardly extending integral flanges engageable with a split lock ring for securing the rim sections together.

In accordance with the patent statutes, at least one embodiment of the invention has been shown and disclosed herein in detail. However, it will be understood that the invention is not limited to the construction shown but that the invention is defined in the appended claim.

What is claimed is:

In a tire rim, the combination of a circular rim base comprising a side flange having an inclined bead seat cylindrical on its radial inner surface and sloped on its radial outer surface formed integral therewith, a removable endless side flange ring and a removable transversely split lock ring at the opposite lateral margin from said flange formed integrally with said rim base, said rim base being offset radially inwardly at its edge portion opposite said integral flange, the radial outer edge of said rim base portion terminating in a radially inwardly turned edge, which edge has a circumferentially extending groove formed in its lateral inwardside and its lateral outer face being substantially perpendicular to the surface of said rim base portion; said removable flange ring having a laterally projecting portion sloped on its radially outer surface and being adapted to overlie said offset portion of said base, said sloped surface forming a substantially continuing surface with the outer surface of the rim base when the rim is assembled, said removable flange ring having a radially inwardly projecting edge complemental to the radially inwardly turned edge of said rim base portion, the lateral outer face of the inturned edge of the removable flange ring having a circumferentially extending groove therein; said lock ring being channel shape in section with the channel opening radially outwardly, the sides of said channel being parallel and having a laterally inwardly extending marginal rib on each of said sides adapted to cooperate with the grooves in said rim base and removable flange ring whereby said rim base and side flange ring are completely locked together, said rim base and side flange ring completely overlying said lock ring radially outwardly thereof.

JAMES E. HALE.

REFERENCES CITED

The following references are of record in the file of this patent:

UNITED STATES PATENTS

| Number | Name | Date |
|---|---|---|
| 872,836 | Mell | Dec. 3, 1907 |
| 960,983 | Mell | June 7, 1910 |
| 1,094,509 | Wirth | Apr. 28, 1914 |
| 1,095,349 | Osborne | May 5, 1914 |
| 1,160,977 | Capithorn | Nov. 16, 1915 |
| 1,583,994 | Randall | May 11, 1926 |
| 1,595,335 | Atkins | Aug. 10, 1926 |
| 1,718,697 | Littman | June 25, 1929 |
| 1,819,403 | Baker | Aug. 18, 1931 |
| 2,149,205 | Brink | Feb. 28, 1939 |

FOREIGN PATENTS

| Number | Country | Date |
|---|---|---|
| 628,957 | France | of 1927 |
| 752,132 | France | 1933 |